(12) United States Patent
Macchia

(10) Patent No.: US 11,352,954 B2
(45) Date of Patent: Jun. 7, 2022

(54) INTERCOOLING SYSTEMS AND METHODS FOR AIRCRAFT ENGINES

(71) Applicant: PRATT & WHITNEY CANADA CORP., Longueuil (CA)

(72) Inventor: Enzo Macchia, Kleinburg (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 44 days.

(21) Appl. No.: 16/801,928

(22) Filed: Feb. 26, 2020

(65) Prior Publication Data

US 2021/0262392 A1    Aug. 26, 2021

(51) Int. Cl.
*F02C 7/00*        (2006.01)
*F02C 7/18*        (2006.01)
*F02C 9/18*        (2006.01)

(52) U.S. Cl.
CPC ............... *F02C 7/185* (2013.01); *F02C 9/18* (2013.01); *F05D 2260/211* (2013.01); *F05D 2260/213* (2013.01)

(58) Field of Classification Search
CPC .... F02C 7/185; F02C 7/143; F05D 2260/213; F05D 2260/211; B64D 2013/0618
See application file for complete search history.

(56) References Cited

U.S. PATENT DOCUMENTS

| 6,134,880 | A | * | 10/2000 | Yoshinaka | ................ F28D 7/00 60/226.1 |
| 7,823,389 | B2 | | 11/2010 | Seitzer et al. | |
| 9,359,952 | B2 | | 6/2016 | Menheere et al. | |
| 9,611,744 | B2 | | 4/2017 | Taylor | |
| 9,724,746 | B2 | | 8/2017 | Eleftheriou et al. | |
| 9,856,793 | B2 | * | 1/2018 | Zelesky | .................. F02C 7/143 |
| 2011/0138818 | A1 | * | 6/2011 | Mizukami | ............... F01D 21/00 60/778 |
| 2019/0178160 | A1 | | 6/2019 | Jones et al. | |
| 2020/0217326 | A1 | * | 7/2020 | DeFrancesco | .......... F01D 5/048 |

OTHER PUBLICATIONS

S. Boggia et al. Intercooled Recuperated Aero Engine, Advanced project Design, MTU Aero Engines, 2004, Munchen, Germany, https://www.yumpu.com/en/document/read/11154596/intercooled-recuperated-aero-engine-mtu-aero-engines, accessed on Nov. 12, 2019.

* cited by examiner

*Primary Examiner* — Katheryn A Malatek
(74) *Attorney, Agent, or Firm* — Norton Rose Fulbright Canada LLP

(57) ABSTRACT

Intercooling systems and methods for an aircraft engine are provided. An intercooling system includes: a first inlet configured to receive a first air flow of ambient air into the aircraft engine; a second inlet separate from the first inlet and configured to receive a second air flow of ambient air into the aircraft engine separately from the first air flow of ambient air; and a heat exchanger configured to facilitate heat transfer between at least a portion of the first air flow compressed by a compressor section of the aircraft engine and the second air flow.

9 Claims, 12 Drawing Sheets

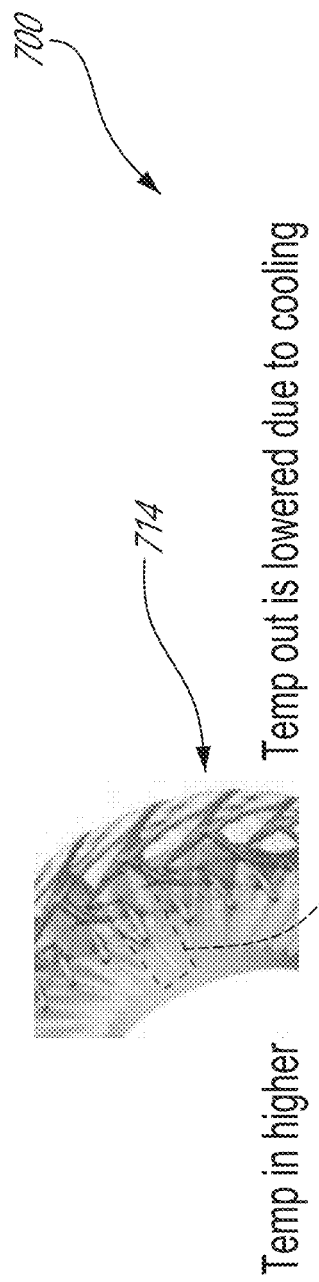
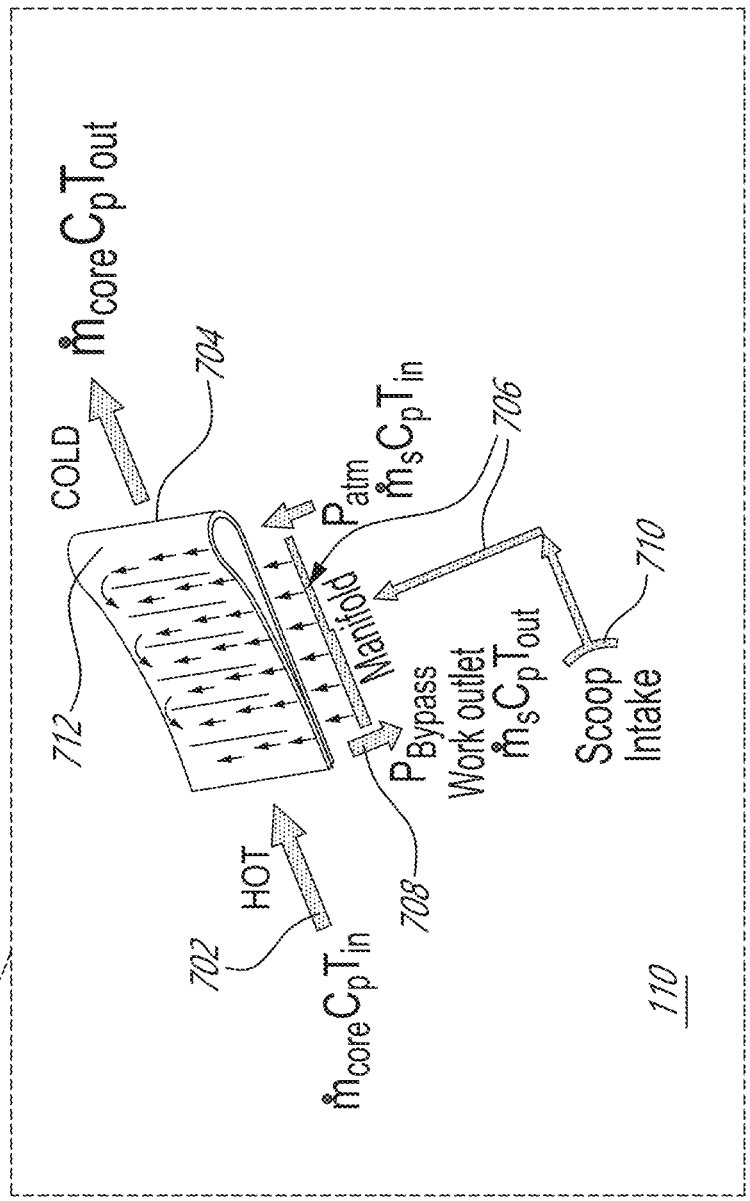
FIG. 7

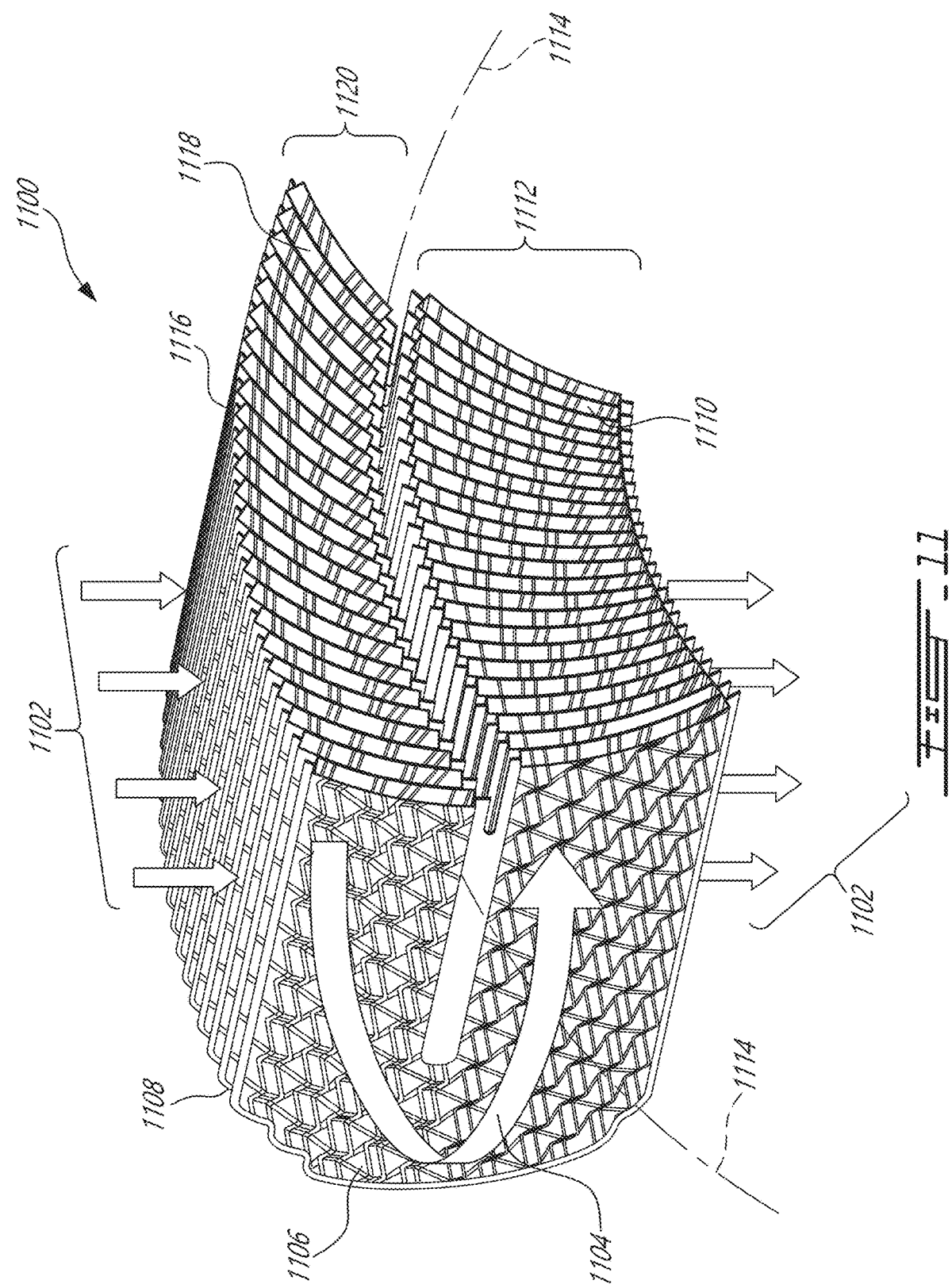

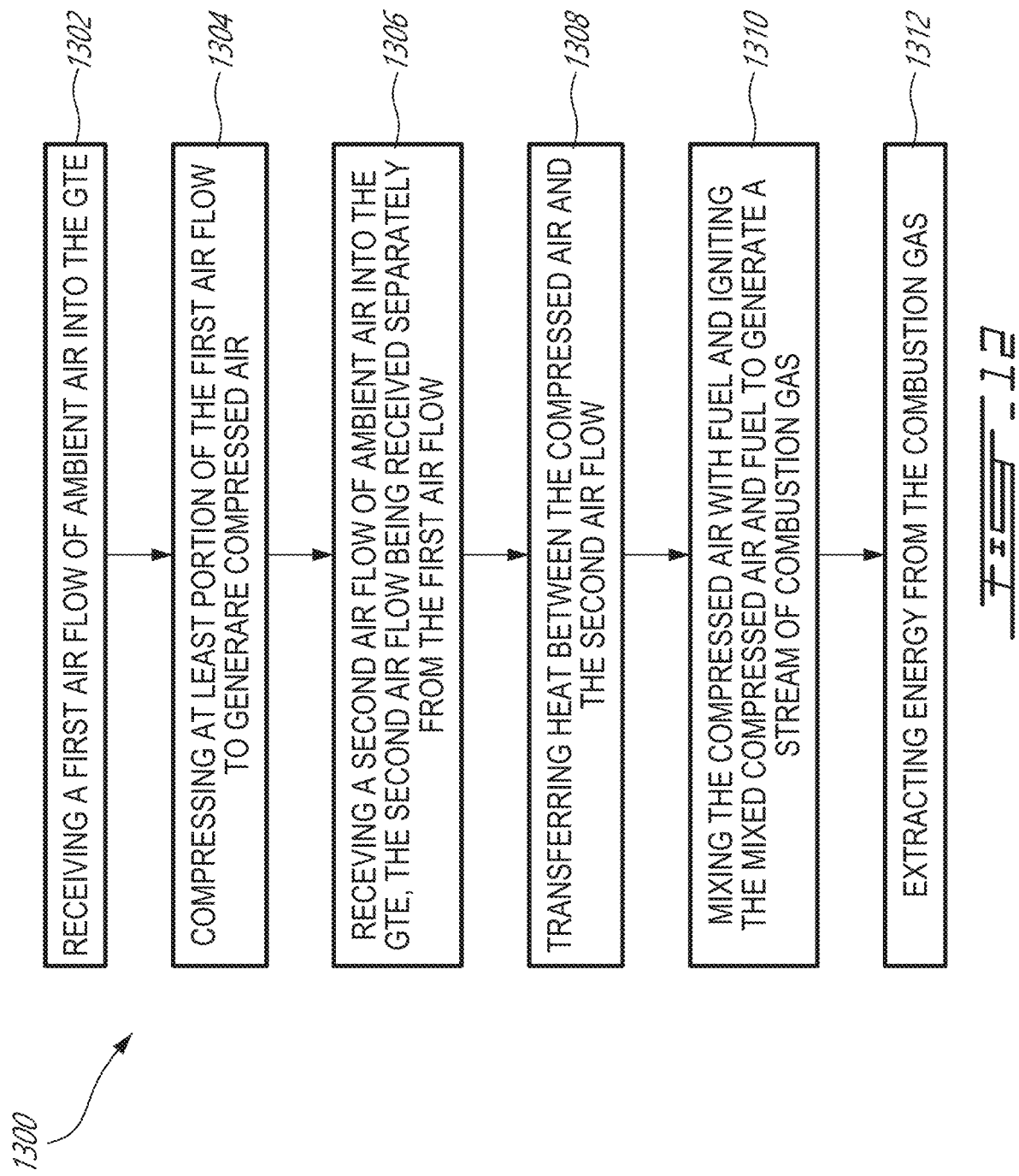

INTERCOOLING SYSTEMS AND METHODS FOR AIRCRAFT ENGINES

TECHNICAL FIELD

This application relates generally to aircraft engines, and more particularly, to intercooling systems and methods for aircraft engines.

BACKGROUND

Gas turbine engines used for aircraft applications typically include a compressor section for pressurizing the air, a combustor in which the compressed air is mixed with fuel and ignited for generating a stream of hot combustion gases, and a turbine for extracting energy from the combustion gases. Compression of air may increase the temperature of the air. In a multi-stage compressor section, such increase in temperature of the air during compression can reduce the compression efficiency and affect the overall efficiency of a gas turbine engine. Improvement is desired.

SUMMARY

In one aspect, there is provided a method of operating a gas turbine engine (GTE) of an aircraft. The method comprises:
  receiving a first air flow of ambient air into the GTE;
  compressing at least a portion of the first air flow to generate compressed air;
  receiving a second air flow of ambient air into the GTE, the second air flow being received separately from the first air flow;
  transferring heat between the compressed air and the second air flow;
  mixing the compressed air with fuel and igniting the mixed compressed air and fuel to generate a stream of combustion gas; and
  extracting energy from the combustion gas.

In another aspect, there is provided an intercooling system for a gas turbine engine (GTE) of an aircraft. The system comprises:
  a first inlet configured to receive a first air flow of ambient air into the GTE;
  a second inlet separate from the first inlet and configured to receive a second air flow of ambient air into the GTE separately from the first air flow of ambient air; and
  a heat exchanger configured to facilitate heat transfer between at least a portion of the first air flow compressed by a compressor section of the GTE and the second air flow.

In a further aspect, there is provided an aircraft engine comprising:
  a first inlet configured to receive a first air flow of ambient air into the aircraft engine;
  a compressor section configured to receive at least a portion of the first air flow and generate compressed air;
  a second inlet separate from the first inlet and configured to receive a second air flow of ambient air into the aircraft engine separately from the first air flow of ambient air;
  a heat exchanger configured to facilitate heat transfer between the compressed air and the second air flow;
  a combustor in which the compressed air is mixed with fuel and ignited to generate a stream of combustion gas; and
  a turbine section configured to extract energy from the combustion gas.

DESCRIPTION OF THE DRAWINGS

Reference is now made to the accompanying figures in which:

FIG. 7 is a schematic illustration of a stator vane heat exchanger configured to cool compressed air;

FIG. 11 is a perspective view of an exemplary stacked plate heat exchanger; and FIG. 12 is a flowchart for an exemplary method of operating a GTE of an aircraft.

DETAILED DESCRIPTION

Figure 1:
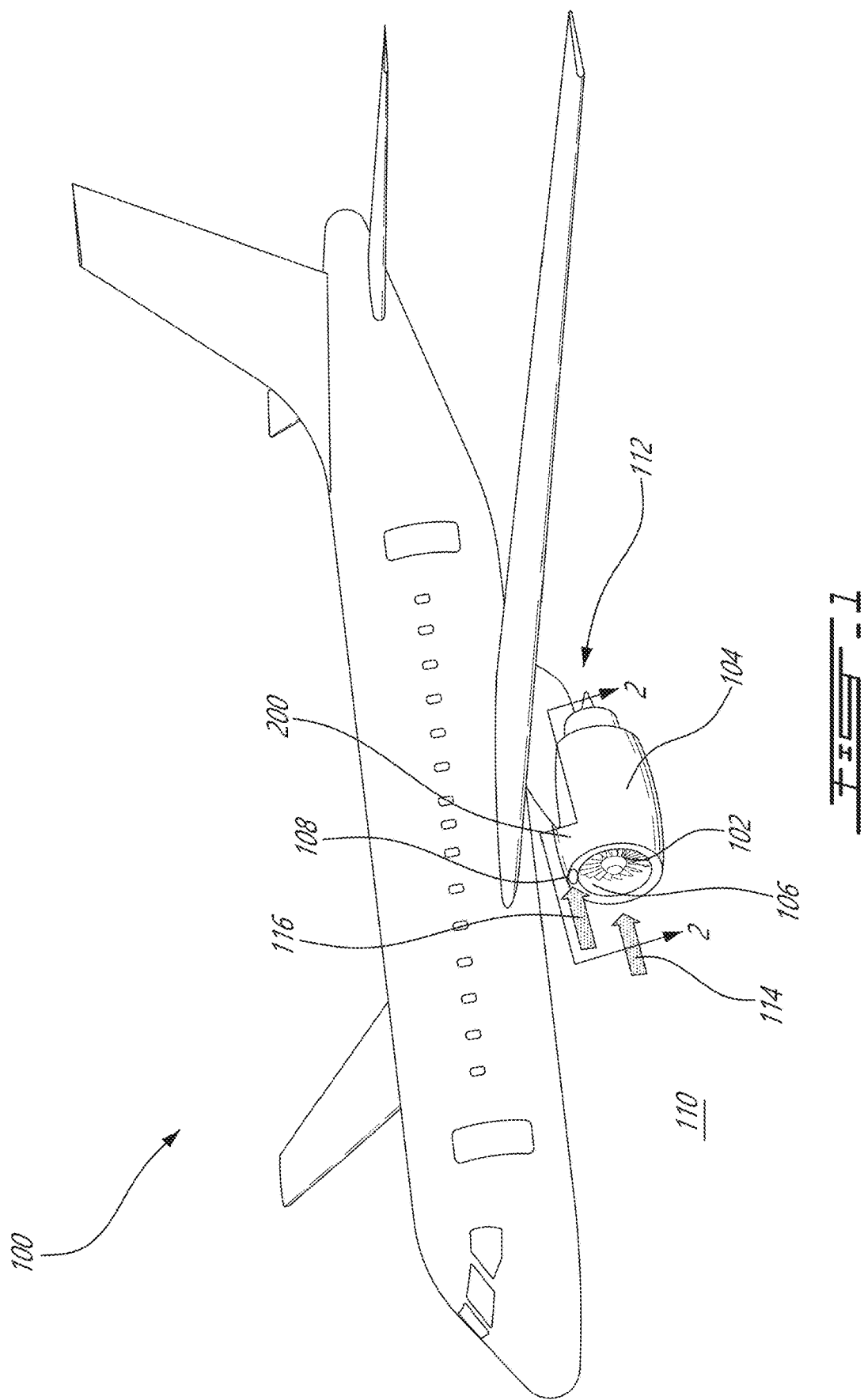
FIG. 1 is a perspective view of an exemplary aircraft during flight where the aircraft includes a gas turbine engine (GTE) having a system as described herein.

FIG. 1 is a perspective view of an exemplary aircraft 100 during flight. A gas turbine engine (GTE) 102 may be mounted to the aircraft 100 for providing propulsion to the aircraft 100. The GTE 102 may be housed inside a nacelle 104 of the aircraft 100, which may circumferentially surround an engine case. The nacelle 104 may leave the first inlet 106 (i.e., main air intake), second inlet 108 and the one or more GTE outlets 112 exposed to ambient air 110. Ambient air 110 may (during flight) be moving at high speed relative to the aircraft 100.

Figure 2:
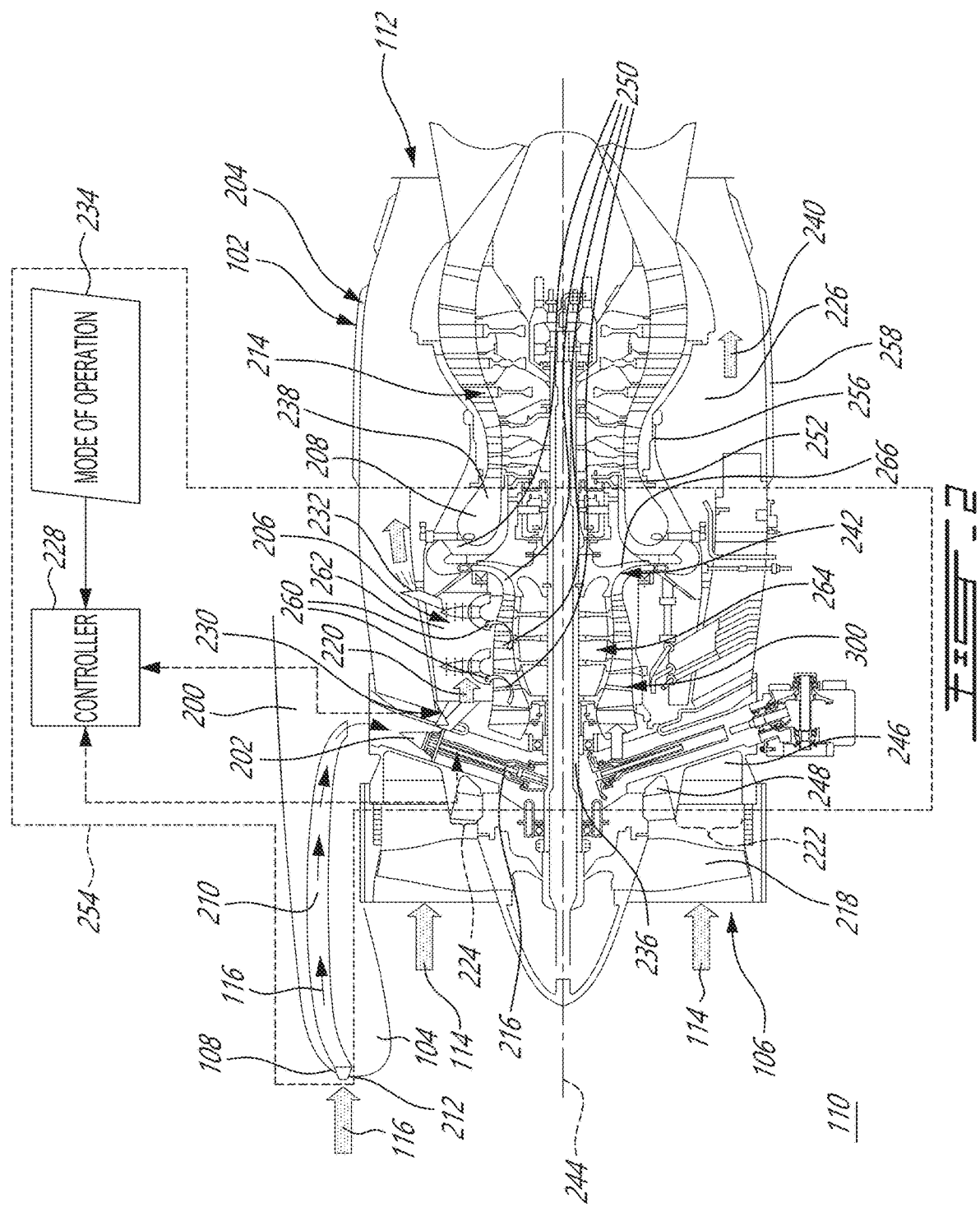
FIG. 2 is a cross-sectional view through the GTE of the aircraft taken along line 2-2 in FIG. 1.

FIG. 2 is an axial cross-sectional view of GTE 102 and upper part 200 of nacelle 104 along a cutting plane defined by line 2-2 shown in FIG. 1. The GTE 102 may receive a first air flow 114 through the first inlet 106, and may receive a second air flow 116 separate from the first air flow 114 through the second inlet 108.

In some embodiments, the GTE 102 may be a turbofan engine. In other embodiments, GTE 102 may be configured to provide shaft power as in a turboshaft. The description that follows will be in reference to GTE 102, or specifically to a turbofan engine embodiment. However, it is intended that parts of the description may apply to other embodiments of GTEs, including various types of aircraft engines such as turbojet, turboprop, and turboshaft, for example.

The GTE 102 may be equipped with an embodiment of an intercooling system 254. The GTE 102 is of a type preferably provided for use in subsonic flight, generally comprising in serial flow communication a fan 218 through which ambient air 110 is propelled, a compressor section 300 for pressurizing the air, a combustor 208, and one or more turbines 214. Directionality and positioning within the GTE 102 may be described using an axial direction defined by a central axis (engine centreline 244) of the GTE 102, a radial direction extending outwardly from a centre of the engine (perpendicular to the engine centreline 244), and an angular direction describing angular rotation around the central axis.

A first air flow 114 of ambient air 110 is received by the GTE 102 via first inlet 106. At least a portion 248 of the first air flow 114 enters an engine core 238 via core engine inlet 224. The portion 248 is compressed in the compressor section 300, inside the core gas path 242, to generate compressed air 250, e.g. via successive compression (pressurization) in a sequential array of compressor stages and impeller 266. The compressed air 250 is mixed with fuel. The mixed compressed air and fuel is ignited to generate a stream of combustion gas 252. Energy is extracted from the combustion gas 252 using the turbine 214, and exhausted through the GTE outlet 112 (e.g. exhaust outlet). The turbine 214 may rotatably drive a turbine-driven shaft 236, e.g. a low pressure shaft and a high pressure shaft may together or separately form turbine-driven shaft(s). In some embodiments, GTE 102 may comprise a plurality of separately rotatable, or coupled turbine-driven shafts.

In some embodiments, including the embodiment shown in FIG. 2, the GTE 102 is a turbofan engine 204 having a core gas path 242 and a bypass duct 226. The portion 248 of the first air flow 114 may be a first portion 248; a second portion 246 may be received in the bypass duct 226 via the bypass duct inlet 222 to form the bypass flow 240, which is eventually exhausted out of the GTE 102 via the one or more GTE outlets 112. The bypass duct 226 may be disposed between an inner case 256 and an outer case 258.

First inlet 106 may be a main (e.g. fan) intake configured to receive the ambient air 110 and supply the air received to the core engine inlet 224 and the bypass duct inlet 222.

A second inlet 108 separate from the first inlet 106 may be configured to receive a second air flow 116 of ambient air 110 into the GTE 102 separately from the first air flow 114. The second air flow 116 may not flow into the core gas path 242 and thus may not directly change the amount of first air flow 114 provided to the GTE 102 through the first inlet 106. The second air flow 116 may not originate from the bypass duct 226. The second inlet 108 may prevent reducing propulsive efficiency of the fan 218 by taking in air separately from the first air flow 114.

The second inlet 108 may be disposed and configured to receive (and pressurize) ambient air 110 as ram air 210 during flight of the aircraft 100. In some embodiments, the second inlet 108 may be tangential to and extend partially or fully circumferentially around the nacelle 104 and/or the outer case 258. In some embodiments, the second inlet 108 may be positioned at or near the lip of the first inlet 106. The second inlet 108 may include a ram air inlet 212 including a scoop, e.g. provided in the nacelle 104, configured to direct ambient air 110 around the aircraft 100 during flight into the GTE 102. The scoop may be configured to receive or direct flow thereinto via alignment with (a component of) the local air velocity to receive a sufficient amount of ram air 210 during flight, e.g. as may be needed downstream.

Heat may be transferred between the compressed air 250 and the second air flow 116. The physical conditions and properties (such as temperature and latent heat) of the compressed air 250 relative to the second air flow 116 may be suitable to facilitate transfer of heat from the compressed air 250 to the second air flow 116 to thereby cool the compressed air 250. In some embodiments, at least some of the second air flow 116 (e.g. the portion 260) and at least some of the compressed air 250 is directed into a heat exchanger 206. The heat exchanger 206 may be separate from the compressor section 300. The heat exchanger 206 may be configured to facilitate heat transfer between at least a portion 260 of the first air flow compressed by a compressor section 300 of the GTE 102 and the second air flow 116. In some embodiments, the compressed air 250 may be further compressed after transferring heat between (at least some of) the compressed air 250 and the second air flow 116.

In some embodiments, the heat exchanger 206 is disposed inside a plenum 262 radially outwardly of a spool 264 of the GTE. In some embodiments, the plenum 262 may be considered an integral part of the heat exchanger 206. The plenum 262 may be a substantially or partially annular volume, partially enclosed by boundary walls for directing or partially retaining a fluid. The plenum 262 may be a substantially closed container or receptacle, or may be closed at one end thereof and open at another end thereof. The plenum 262 may include one or more volumes for facilitating heat transfer, e.g. a volume may contain a liquid coolant mediating heat transfer between compressed air 250 and second air flow 116 (ram air 210 or pressurized second air flow 220), and which may exploit the latent heat of vaporization to facilitate efficient heat transfer.

In some embodiments, the intercooling system 254 may include an outlet 232 configured to establish fluid communication for at least some of the second air flow 116 from the heat exchanger 206 to the bypass duct 226. After transferring heat between the compressed air 250 and the second air flow 116, at least some of the second air flow 116 may be discharged into the bypass duct 226, e.g. via the outlet 232 described above. In some embodiments, the outlet 232 may be configured to discharge second air flow 116 out of the GTE 102 and not into a bypass duct 226.

The second air flow 116 may be compressed (pressurized) before transferring heat between the compressed air 250 and the second air flow 116. In some embodiments, a (e.g., radial or axial) compressor 202 configured to compress the second air flow 116 may be used. The compressor 202 may be operatively disposed upstream of the heat exchanger 206. The compressor 202 may receive the second air flow 116 to generate pressurized second air flow 220. The pressurized second air flow 220 and its physical state (such as temperature) may be suitable for facilitating heat transfer from the compressed air 250 to the second air flow 116. For example, the compressor 202 may be configured to provide compression of the second air flow 116 so that pressurized second air flow 220 is still cooler than the compressed air 250.

The compressor 202 may be configured to be driven via a tower shaft 216 drivingly coupled to a turbine-driven shaft 236 of the GTE 102. The tower shaft 216 may be separate from shaft(s) that are part of the spools in the core gas path 242 and may extend radially outwardly from the turbine-driven shaft 236 it is coupled to, e.g. by means of gear assemblies allowing coupling along a plurality of rotational axes (e.g., including bevel gear(s)). In some embodiments, tower shaft 216 may also be used to power non-propulsive (accessory) components of the aircraft 100 via an accessory gearbox connected to and rotatably driven by the tower shaft 216. In other embodiments, means others than the compressor 202 may be used to (solely or in conjunction with the compressor 202) generate pressurized second air flow 220, e.g. via the ram air inlet 212, one or more diffusers, or other devices for pressurization provided downstream of the second inlet 108. In some embodiments, the compressor 202 may be driven by an electric motor or other means.

In some embodiments, pressurization of pressurized second air flow 220 may prevent backflow from a downstream location, such as from the bypass duct 226 or heat exchanger 206. The second air flow 116 at the outlet 232 may be in a different physical state than that immediately downstream of the second inlet 108. The compressor 202 may be operated based on the ram air 210 physical state exiting the outlet 232 to ensure a target operation of the fan 218 or GTE 102, e.g. the compressor 202 may be operated so that pressurized second air flow 220 that is discharged is at a similar or higher pressure than the bypass flow 240 at least in a region proximal to the outlet 232. In some embodiments, pressurization may ensure that any pressurized second air flow 220 subsequently released into the bypass duct 226 is not parasitic to the efficiency of the fan 218 or is only weakly so.

The intercooling system 254 may include a valve 230 configured to control the second air flow 116 to the heat exchanger 206. For example, valve 230 may be a hydraulic, pneumatic, solenoidal (or electrically or electronically actuated), mechanical, or magnetically actuated valve. In some embodiments, the valve 230 may automatically respond to one or more operating conditions. In some embodiments, the valve 230 may be a controllable valve that allows control of pressure, flow rate, or other flow properties. In some embodiments, a secondary flow path may be provided from the second inlet 108 to a location downstream of the compressor 202 and which bypasses the compressor 202. The valve 230 may be disposed in the secondary flow path. In some embodiments, the valve 230 block flow in the secondary flow path and allow flow through the compressor 202 in a first configuration, and block flow through the compressor 202 and allow flow through the secondary flow path in a second configuration.

A controller 228 may be configured to control second air flow 116 into the GTE 102 based on a mode of operation 234 of the GTE 102. The mode of operation 234 may be a desired (by a user), required or suggested (for example, by a computer), possible, or potential condition or operational state of the GTE 102, an aircraft to which the GTE 102 is mounted, or the ambient atmospheric conditions surrounding the aircraft 100. For example, the mode of operation may be sustained cruise flight of the aircraft 100 or power level of the GTE 102. The controller 228 may be part of the GTE 102, such as part of a full-authority digital engine control (FADEC) system and/or an electronic engine controller (EEC). The controller 228 may include one or more processors and computer readable memory with instructions stored thereon. The instructions may be configured to cause the one or more processor(s) to carry out one or more steps of a method or respond to an event (such as receiving an input from a user or from a sensor). The controller 228 may further be connected to one or more actuators and sensors, including to facilitate carrying out or activating the one or more methods or responses described above. The controller 228 may be configured to functionally control operation of the valve 230 and/or compressor 202, e.g. based on the mode of operation 234. For example, the valve 230 may be configured to open or close a flow path of the second air flow 116 path upon receiving input from the controller 228. Heat transfer between the compressed air 250 and the ram air 210 (e.g. heat rejection from the compressed air 250) may be modified or controlled via the controller 228.

Figure 3:
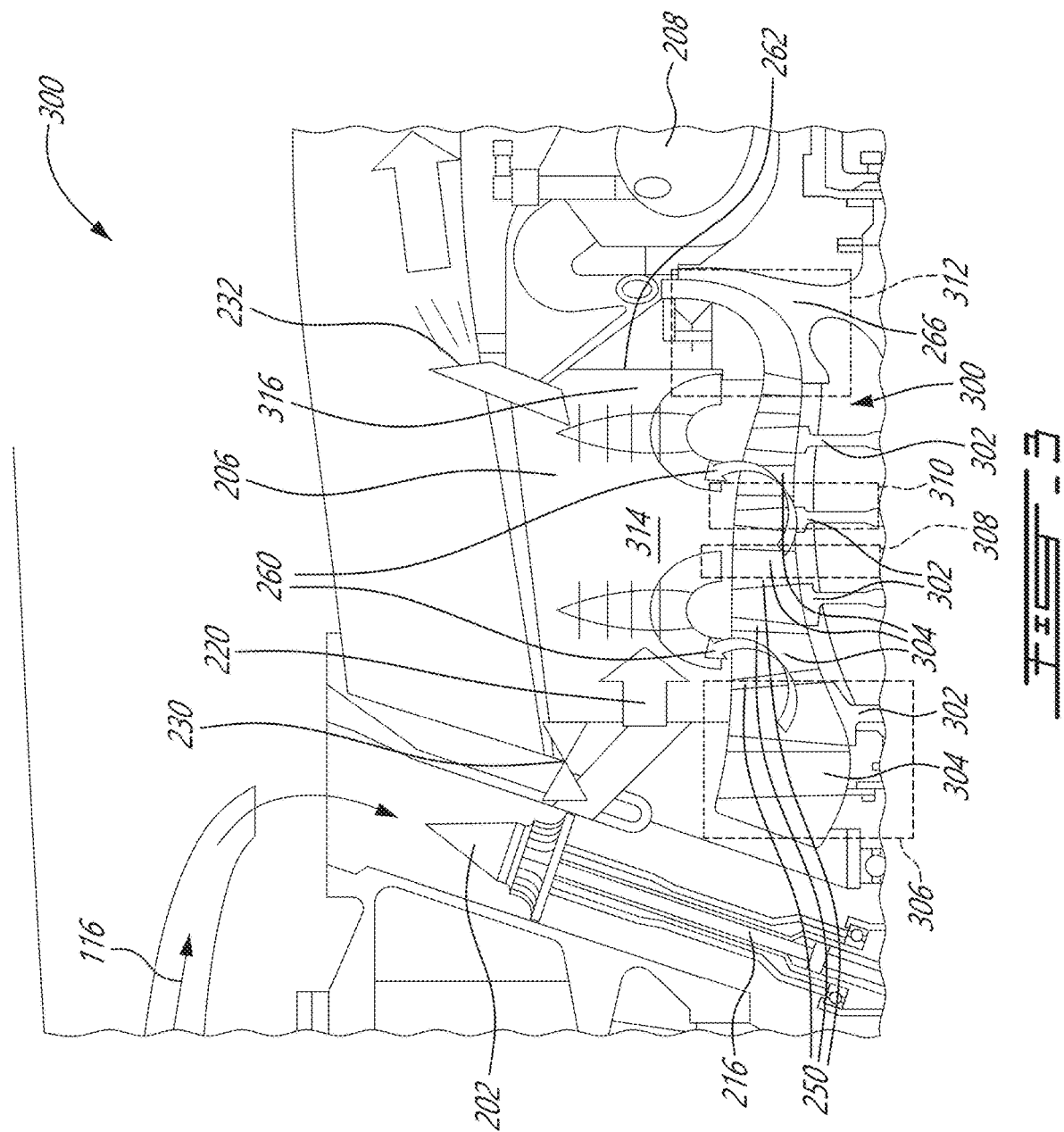
FIG. 3 is an enlarged schematic cross-sectional view of an exemplary compressor section of the GTE.

FIG. 3 is an enlarged schematic cross-sectional view of the aircraft 100, showing a compressor section 300 and second air flow 116 entering the GTE 102. As described below, the compressor section 300 may comprise a plurality of compressor stages in successive arrangement along the core gas path 242 (multi-stage compression). Air pressure and temperature may sequentially increase through the arrangement of the fan 218, and the one or more compressor stages.

The compressor section 300 may comprise a plurality of compressor rotors rotatably driven by the turbine-driven shaft 236 and each of which may have a common axis of rotation aligned with or substantially aligned with the engine centreline 244. The compressor section 300 may additionally comprise a plurality of stationary (non-rotating) stators.

The compressor rotors comprise a plurality of radially extending rotor blades 302 (or discs or airfoils) angularly distributed around the engine centreline 244 and defining an axial distribution of rotor blades 302 through the compressor section 300. One (or more) of the compressor rotors may also be an impeller 266 comprising inducer or exducer portions. The impeller 266 may be positioned upstream of the combustor 208 and may be a last stage of the compressor section 300.

The stators comprise a plurality of radially extending stator vanes 304 angularly distributed around the engine centreline 244 and defining an axial distribution of stator vanes 304 through the compressor section 300. The stator vanes 304 may be held stationary via fixed connection to one or more stator shrouds.

An axial distribution of the plurality of stators (or stator vanes 304) may be interspersed with the plurality of rotors (or rotor blades 302). Thus, a rotor may be immediately axially preceded (with respect to the flow direction) by a stator. A combination of stators and rotors, with at least one of either a rotor or stator, may form a compressor stage. A compressor stage may receive air, or compressed air 250 from an upstream compressor stage, to perform mechanical work (compression or pressurization) thereon and then expel the resulting compressed air 250, to a downstream compressor stage or the combustor 208. Compressor stages 306, 308, 310, and 312 are various exemplary compressor stages of the multi-stage compressor section 300.

The heat exchanger 206 may be configured to be operatively disposed between two compressor stages of the GTE 102, such as between compressor stage 306 and compressor stage 308, or between compressor stage 310 and compressor stage 312. For example: compressor stage 306 may produce compressed air 250 that has also increased temperature as a result of compression, at least some of this compressed air 250 is directed into a heat exchanger section 314 where it loses some of its heat to the second air flow 116 in the plenum 262 (intercooling step), the cooled compressed air 250 is then directed back into the compressor section 300 at compressor stage 308 where it is compressed again.

In some embodiments, one or more additional intercooling stages may be provided. For example, at least some of the compressed air 250 generated by compressor stage 308 may be directed into a heat exchanger section 316 to transfer heat to the second air flow 116. Such intercooling of the working fluid by removing some of the heat-of-compression between discrete compression steps may help realize greater compression efficiency. Intercooling may densify air in the core gas path 242.

Figure 4:
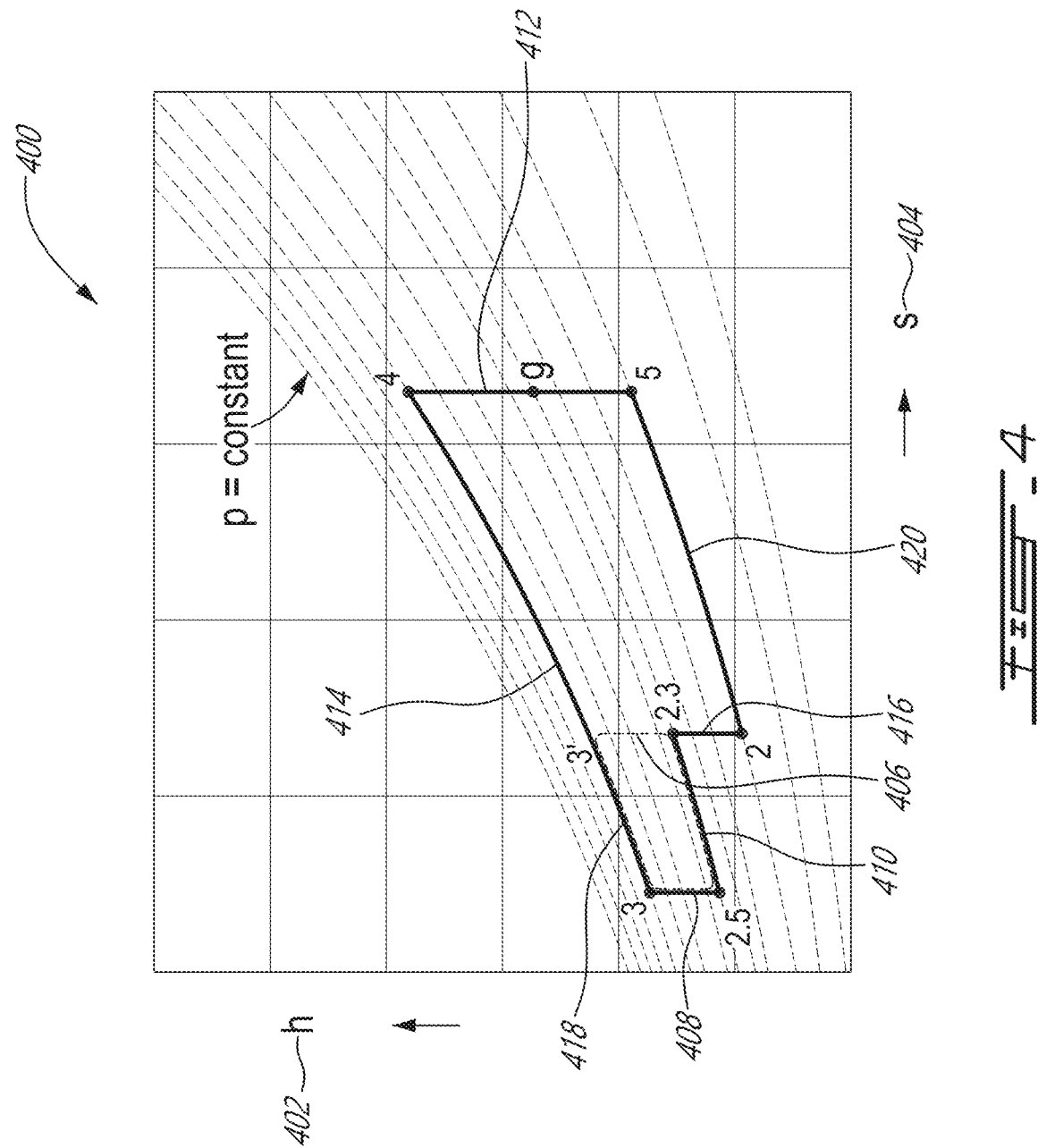
FIG. 4 is a schematic entropy-enthalpy diagram of an intercooled Brayton cycle.

FIG. 4 is a schematic entropy-enthalpy diagram 400 of an intercooled Brayton cycle. The working fluid of the GTE 102 may schematically evolve, at least partially, according to the thermodynamic cycle shown in FIG. 4 in terms of entropy 404 and enthalpy 402. Concomitant or related changes to other properties of the working fluid (e.g. pressure, density, temperature, volume, phase change) may occur simultaneous to changes in entropy 404 and enthalpy 402, such as may be predicted by a governing equation of state or known tabulated data for the working fluid. The working fluid of the GTE 102 may the portion of the first air flow 114 received via the core engine inlet 224.

The cycle shown in FIG. 4 may schematically represent the working of a closed system, wherein the working fluid is recycled in a cooling stage 420 prior to compression in a first stage compression 416, whereas GTE 102 may be an open system, wherein the working fluid is discarded at a terminus point and fresh working fluid in an appropriate thermodynamic state is introduced to continue the cycle instead. The working fluid may undergo a first stage compression 416 to increase its pressure (and temperature). Thereafter, if the second inlet 108 does not receive the second air flow 116 or ram air 210, the working fluid may undergo a second stage compression without intercooling 406 to increase its pressure (and temperature) to be then mixed with fuel in the combustor 208 for combustion in a combustion stage 414. In some embodiments, after the first stage compression 416, the working fluid is then cooled in an intercooling stage 410 to reduce its temperature and then undergoes second stage compression after intercooling 408 to be then mixed with fuel in the combustor 208 for combustion in the combustion stage 414. This may result in a gain in compression efficiency 418: a higher compression ratio may be achieved and/or lesser energy expended to achieve a given compression ratio. In some embodiments, more than one intercooling stage 410 may be present. The first stage compression 416 may be associated with a compressor stage and may provide air for the intercooling stage 410. The second stage compression after intercooling 408 may be associated with another compressor stage. Similarly, when a plurality of intercooling stages are present, a plurality of compressor stages may be present or identified as such. In some embodiments of GTE 102, these may be generally arranged sequentially in the axial direction (e.g. parallel to the engine centreline 244).

By receiving ram air 210 directly into the GTE 102 to facilitate intercooling, the intercooling stage 410 may thereby not be excessively parasitic to the core gas path 242 or the bypass flow 240 to achieve an intercooling effect to increase engine efficiency. The intercooling stage 410 may be highly effective at reducing working fluid temperature after the first stage compression 416 by utilizing the large temperature delta (for example, greater than 500 degrees F. in some embodiments) between the ambient air 110 and the core gas path 242 during atmospheric flight, especially at high altitude.

Figure 5:
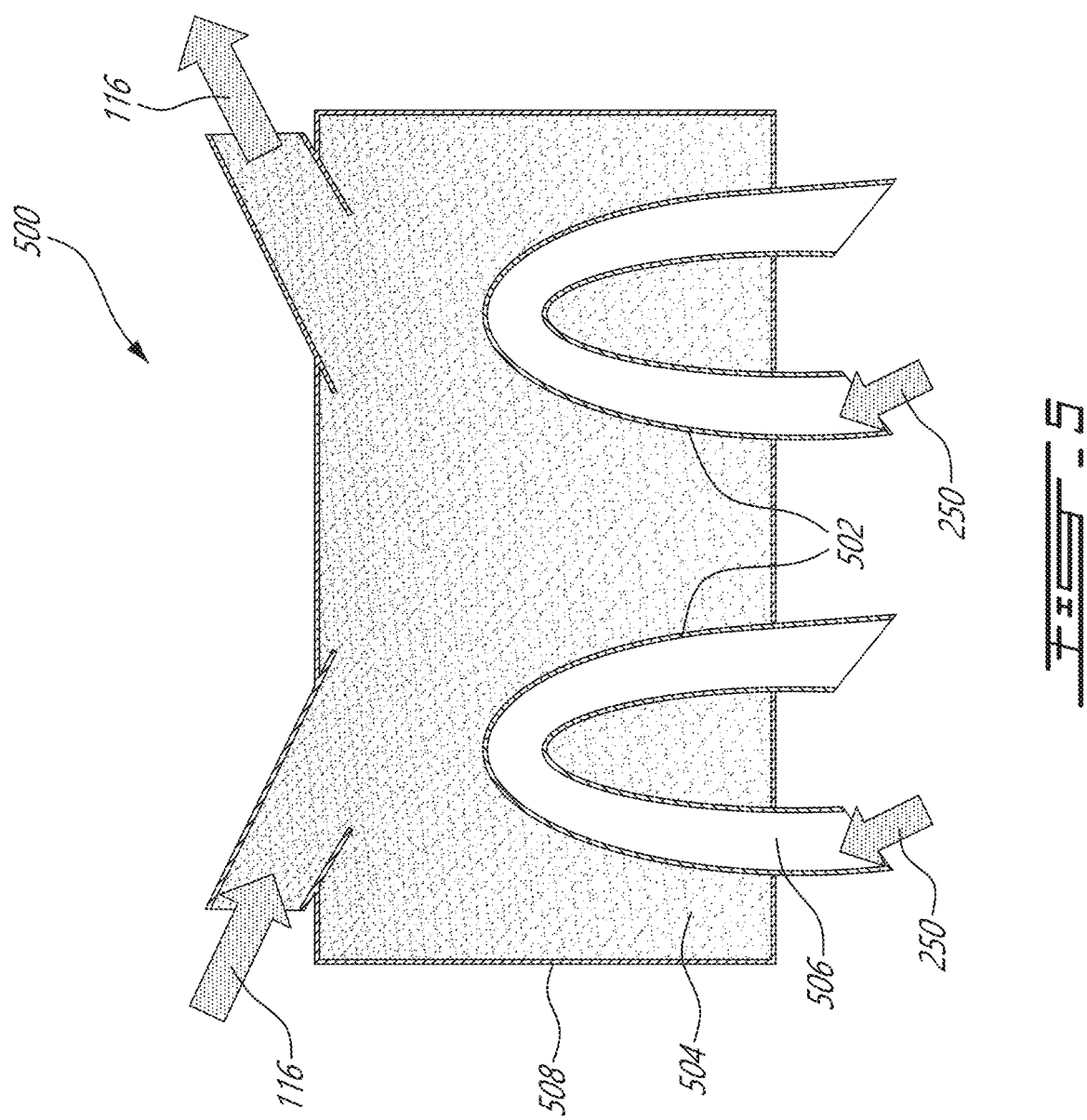
FIG. 5 shows a schematic cross-sectional view of an exemplary heat exchanger.

FIG. 5 shows a schematic cross-sectional view of a heat exchanger 500, in accordance with an embodiment. The heat exchanger 500 may comprise a plenum 508. The plenum 508 may include a first volume 504 substantially free of the compressed air 250 and configured to receive the second air flow 116, which may be pressurized second air flow 220. The plenum 508 may include a second volume 506 substantially free of the second air flow 116 and configured to receive the compressed air 250. The plenum 508 may include heat transfer surfaces 502 separating the first volume 504 from the second volume 506. The first volume 504 and/or second volume 506 may include one or more discrete volumes. In some embodiments, different parts of the compressor section 300 may feed compressed air 250 to different, or similar/same, constituent volumes of the second volume 506.

Although shown schematically with a particular structure in FIG. 5, the heat exchanger 500 may generally be any heat exchanger facilitating heat transfer between the compressed air 250 and ram air 210. For example, in various embodiments, the heat exchanger may be a shell and tube heat exchanger, plate heat exchanger, plate and shell heat exchanger, adiabatic wheel heat exchanger, plate fin heat exchanger, pillow plate heat exchanger, single phase heat exchanger, multiphase heat exchanger, phase-change heat exchanger, direct contact heat exchanger, helical (or spiral) flow heat exchanger, counter-current flow, spiral flow-cross flow, and/or a distributed vapour/spiral flow. Some example embodiments of heat exchangers that may be suitable are presented in FIGS. 6-11.

Figure 6:
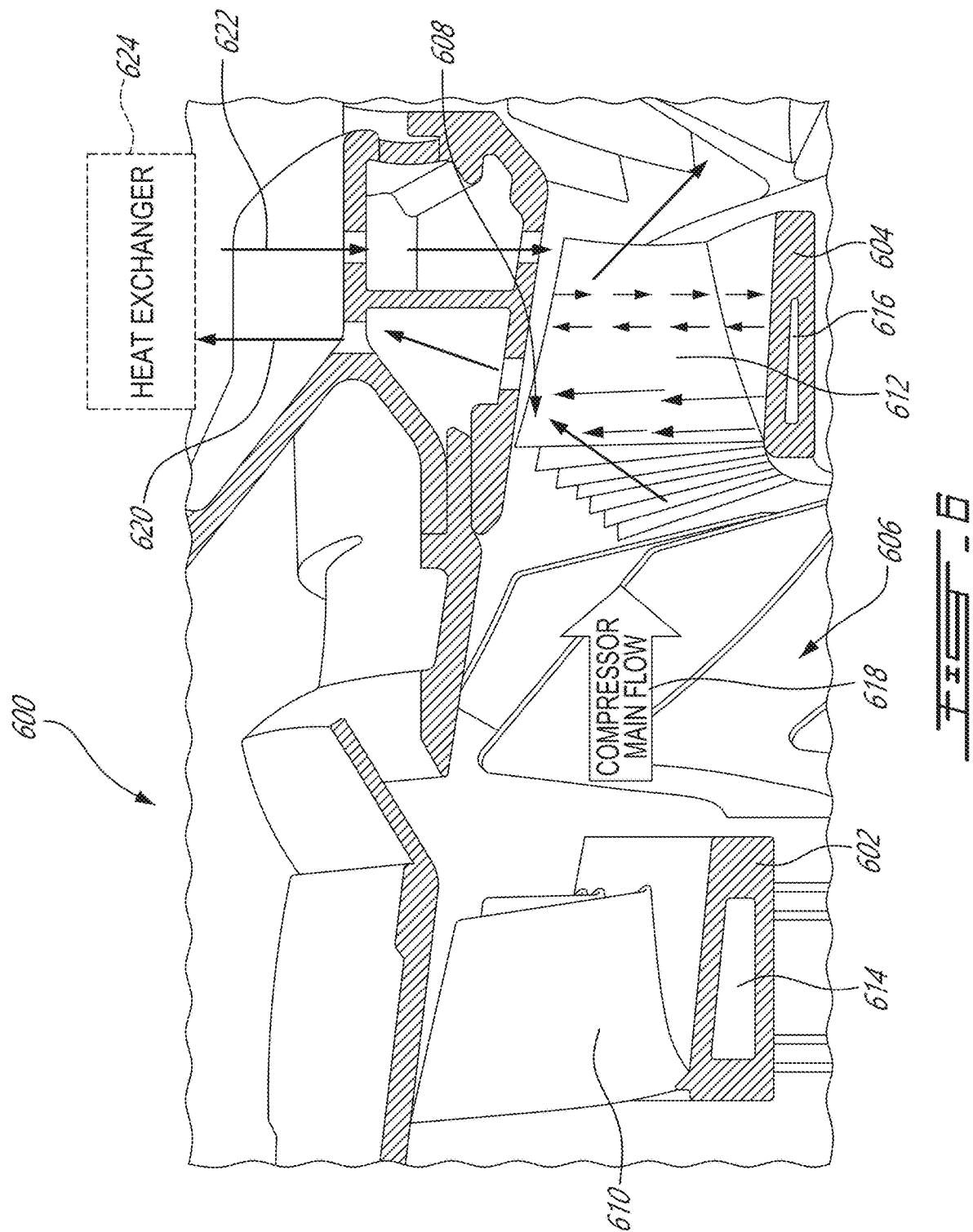
FIG. 6 is another cross-sectional view of an exemplary compressor section.

FIG. 6 is a cross-sectional view of a compressor section 600, in accordance with an embodiment. The main compressor flow (compressed air 618) first flows over the stator vane 610 and stator hub 602, through rotor blades 606 of the adjacent rotor, over the stator vane 612 and stator hub 604, then to the heat exchanger 624 where it is received as higher temperature compressed air 620 to be cooled and returned as lower temperature compressed air 622. Stator vane 612 may be one of a plurality of stator vanes 608.

The heat exchanger 624 may be a separate components. In some embodiments, the heat exchanger 624 may include a stator vane 612 of the compressor section 600. In some embodiments, stators (stator vanes and hubs) may be configured to act as heat exchangers. In some embodiments, at least some of the second air flow may be directed into the stator vane 612, such as in a cavity therein, to cool external surfaces of the stator vane 612 in contact with the compressed air 618. Similarly, second air flow may be directed into stator hub cavity 614 and/or stator hub cavity 616 for heat exchange with the compressed air 618.

The stator vanes 608 may also circulate second air flow 116 within cooling channels contained therein (cavities in the stators channels configured to receive a cooling fluid) to act as heat exchangers. The stator vanes 608 may cool the surrounding air by having or maintaining a lower relative temperature, e.g. as may be facilitated by stator vanes 608 comprising means for heat rejection or temperature control. The stator vanes 608 may be cooled via external flow, such as an external flow which is separate and/or distinct from the compressed air 618. The stator vanes 608 and stator hubs may comprise internal cavities or volumes to receive and circulate the external flow within the stator vanes 608 and hubs, including for cooling. The external flow may be liquid, gas, or a coolant liquid operating close (in a thermodynamic sense) to its vapour point to encourage heat transfer.

FIG. 7 is a schematic of a stator vane heat exchanger 700 configured to cool compressed air. Also shown are stator vanes 714 with internal cooling, of which a stator vane 712 is described next. Cold ambient air 110 is taken in via the second inlet 710 and passed into internal cooling channels in the stator vane 712. Hot compressed air 702 passes over the stator vane 712 and cools due to heat transfer into the internal cooling channels of the stator vane 712, to leave as cooler compressed air 704 downstream of the stator vane 712. The heat transfer raises the temperature of the second air flow 706, causing a flow of hotter second air flow 708 leaving the stator vane 712, e.g. to the bypass duct.

Figure 8:
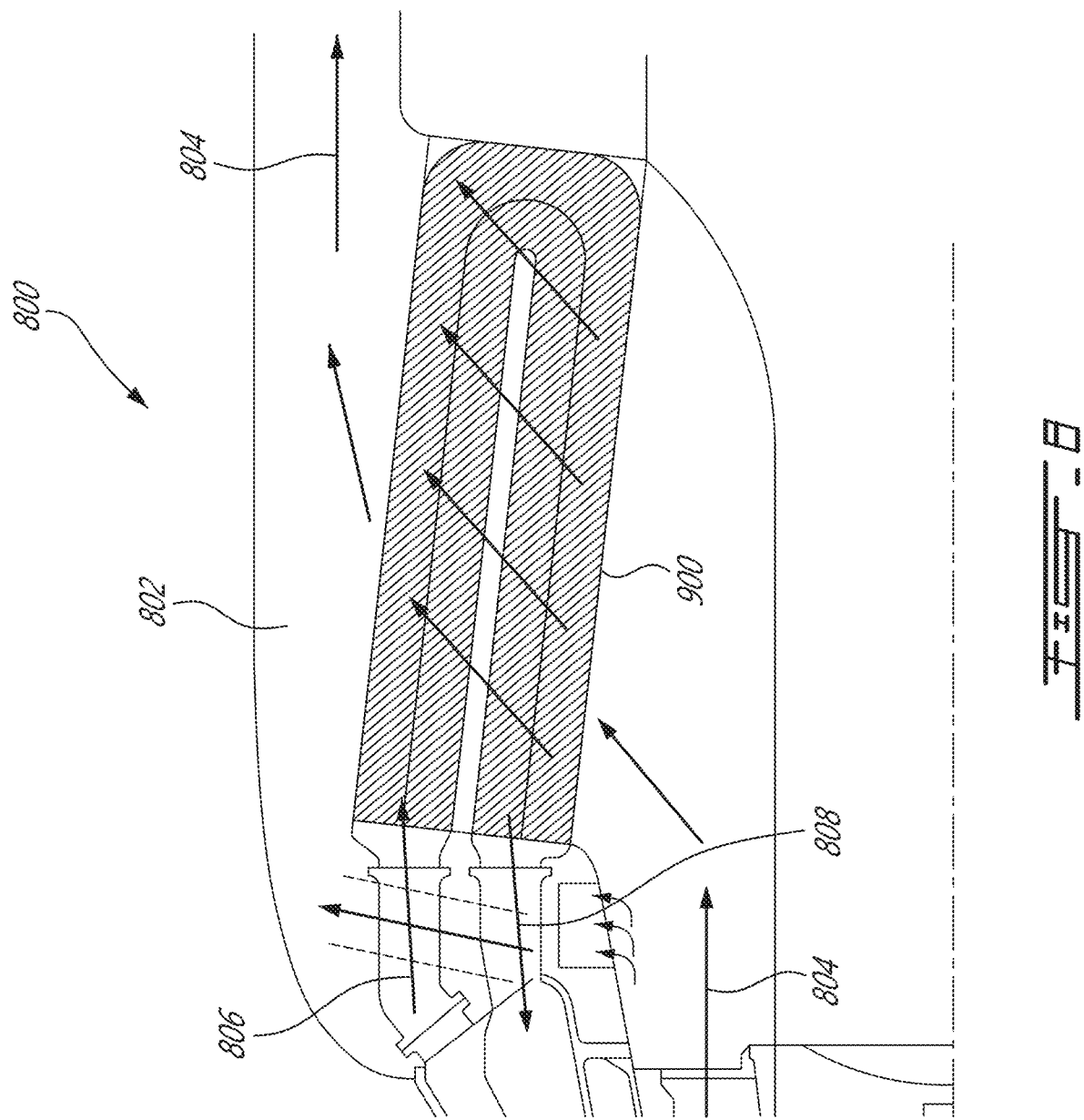
FIG. 8 is an enlarged schematic cross-sectional view through an exemplary heat exchanger in accordance with an embodiment.

FIG. 8 is an enlarged schematic cross-sectional view of part 800 of an exemplary GTE along a cutting plane parallel to the axial direction, showing a heat exchanger 900 in accordance with an embodiment. The heat exchanger 900 extends across plenum 802, such that hot compressed air 806 from the compressor circulates therethrough and returns to the compressor as cooler compressed air 808. Second air flow 804 is passed through the plenum 802 to absorb heat from the compressed air 806 as it circulates through the heat exchanger 900. Further details on the specifics of the heat exchanger 900 may be found in U.S. Pat. No. 9,724,746, the entire contents of which are incorporated herein by reference.

Figure 9:
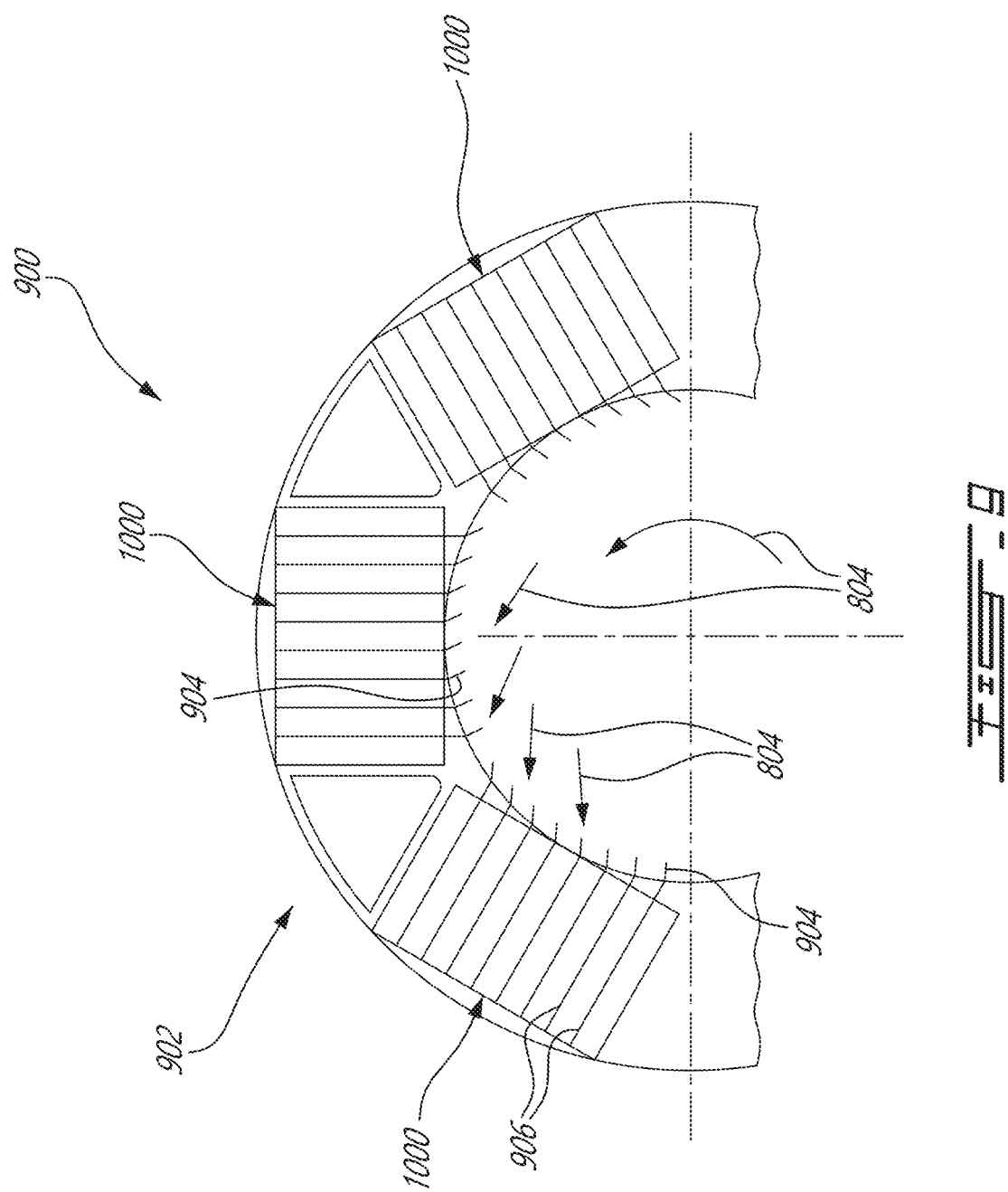
FIG. 9 is a transverse cross-sectional view of the heat exchanger of FIG. 8.

FIG. 9 is a cross-sectional view of the heat exchanger 900 of FIG. 8. Referring to FIG. 8 and FIG. 9, the heat exchanger 900 comprises a plurality of heat exchanger segments 1000, which illustratively function and are connected to the GTE 102 independently from one another. Structural supports 902 may be provided between adjacent ones of the heat exchanger segments 1000 to provide structural stability. The heat exchanger segments 1000 are positioned relative to one another so as to together define the substantially annular shape of the heat exchanger 900.

Each heat exchanger segment 1000 comprises a plurality of plates 906 arranged in a stacked relationship along an axis A. To provide structural stability, the stack may be mounted on one or more backing members 1002 such as a frame, chassis or endplate, which does not impede the flow of fluid through the heat exchanger segment 1000.

Figure 10:
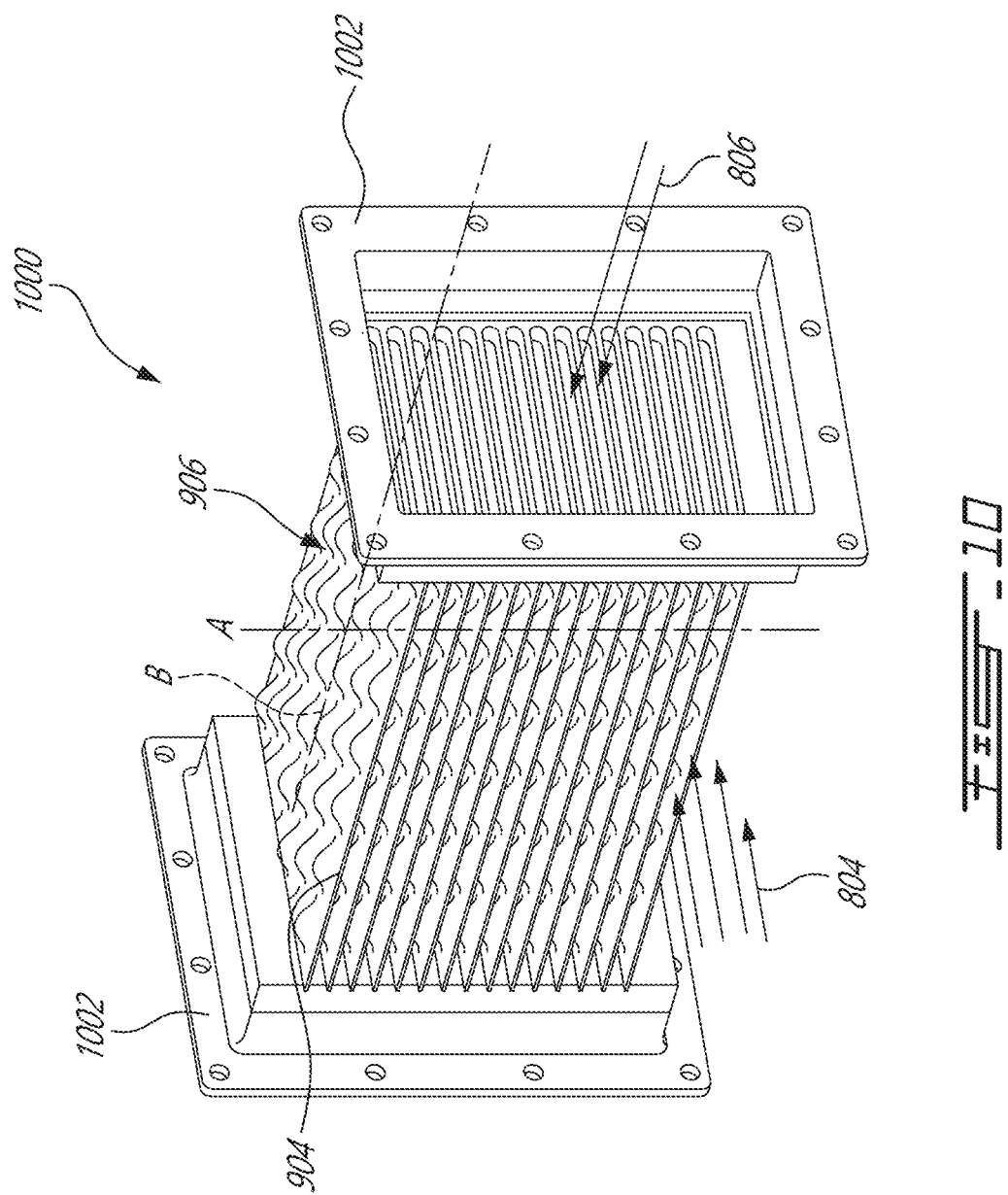
FIG. 10 is a perspective view of a segment of the heat exchanger of FIG. 9.

FIG. 10 is a perspective view of a heat exchanger segment 1000 of FIG. 9.

Referring to FIG. 10 in addition to FIG. 8 and FIG. 9 each plate 906 is elongate and extends along a longitudinal axis B. It should however be understood that each plate 906 may have some axial curvature by shaping and/or angling thereof to introduce some deviation or curvature to the axis B. Each plate 906 comprises a leading peripheral edge 904 and a trailing peripheral edge opposed thereto. With the heat exchanger 900 extending across the plenum 802, compressed air 806 is conducted through the heat exchanger segments 1000 and received at the leading peripheral edge 904 of the plates 906.

The second air flow 804 may subsequently progress through the plates 906 of each heat exchanger segment 1000, and is discharged at the trailing edges. The second air flow 804 may further be drawn, conducted, or otherwise received into the plates 906. Compressed air 806 may be conducted into the plates 906 in a generally transverse direction to the second air flow 804. In particular and as will be detailed below, the compressed air 806 passes through the plates 906 in thermal conductive (or convective) proximity with the second air flow 804 so as to effect heat exchange therewith.

The second air flow 804 and the compressed air 806 are therefore brought closer in temperature than upon entry to the heat exchanger 900. The hotter of the two fluid flows, e.g. compressed air 806, may therefore be cooled while the cooler of the two fluid flows, e.g. second air flow 804, is heated.

FIG. 11 is a perspective view of a stacked plate heat exchanger 1100. There is generally shown a heat exchanger 1100 having a stacked plate configuration in which a stack 1116 is formed out of a number of the fluid channels 1106 mounted in general alignment with each other along on an axis 1114 of the stack 1116. To provide structural stability, a stack 1116 may be mounted on one or more backing members, such as a frame, chassis or endplate (not shown), which does not impede the flow of fluid through the heat exchanger 1100, as explained below.

To facilitate stacking, some or all of fluid channels 1106 may have somewhat planar or flattened profiles, and may be oriented so that the axis 1114 of the stack 1116 is generally horizontal or generally vertical. Fluid channels 1106 may be stacked in relatively close proximity to one another, so that a number of interstitial layers or interstices 1108 are formed between the individual fluid channels 1106 in the stack 1116. In some embodiments, interstices 1108 may be interleaved between fluid channels 1106, such that one or more individual interstices 1108 are sandwiched between adjacent pairs of fluid channels 1106. The particular shape(s) of interstices 1108 may be defined by the shape(s) and spacing(s) of fluid channels 1106 and, in some embodiments, as for example where fluid channels 1106 have a generally planar shape, may resemble interstitial layers or any other generally planar shape.

Each of the fluid channels 1106 may be formed with one or more fluid intake ports 1118 located at one end of the fluid channels 1106, and one or more fluid exhaust ports 1110 located at another end of the fluid channels 1106. One or more of the fluid intake ports 1118 may be located on fluid channels 1106 in common relative location(s) so that, collectively, fluid intake ports 1118 from the fluid channels 1106 may form or otherwise accommodate one or more fluid intake manifolds 1120 for the heat exchanger 1100. Similarly one or more fluid exhaust ports 1110 may be located on fluid channels 1106 in common location(s) so that, collectively, the fluid exhaust ports 1110 form or otherwise accommodate one or more fluid exhaust manifolds 1112 for the heat exchanger 1100. The fluid intake manifolds 1120 and fluid exhaust manifolds 1112 may be used, for example, to provide and/or extract fluid flow(s) to any or all of the fluid channels 1106 simultaneously in parallel.

Fluid channels 1106 may collectively provide one or more fluid passageways that are sealed from the external environment (other than at fluid intake ports 1118 and fluid exhaust ports 1110), including being sealed from interstices 1108. Primary fluid flow(s) 1104 (second air flow or compressed air) may be conducted through any or all of fluid channels 1106 of the heat exchanger 1100. Being sealed off from the fluid channels 1106, the interstices 1108 also collectively define fluid passageway(s) through the heat exchanger 1100 in which secondary fluid flow(s) 1102 (compressed air or second air flow) may be conducted through the heat exchanger 1100 without admixture or interminglement with primary fluid flow(s) 1104 being conducted through the fluid channels 1106.

Further details on the specifics of the heat exchanger 1100 may be found in U.S. Pat. No. 9,359,952, the entire contents of which are incorporated herein by reference.

FIG. 12 is a flowchart for an embodiment of a method 1300 of operating a gas turbine engine (GTE) of an aircraft during flight. At block 1302, method 1300 includes receiving a first air flow 114 of ambient air 110 into the GTE 102. At block 1304, method 1300 includes compressing at least portion 248 of the first air flow to generate compressed air 250. At block 1306, method 1300 includes receiving a second air flow 116 of ambient air 110 into the GTE 102, the second air flow 116 being received separately from the first air flow 114. At block 1308, method 1300 includes transferring heat between the compressed air 250 and the second air flow 116. At block 1310, method 1300 includes mixing the compressed air 250 with fuel and igniting the mixed compressed air 250 and fuel to generate a stream of combustion gas 252. At block 1312, method 1300 includes extracting energy from the combustion gas 252.

In some embodiments, the method 1300 comprises compressing the second air flow 116 before transferring heat between the compressed air 250 and the second air flow 116.

In some embodiments, the method 1300 comprises driving a compressor 202 via a tower shaft 216 drivingly coupled to a turbine-driven shaft 236 of the GTE 102; and using the compressor 202 to compress the second air flow 116.

In some embodiments of the method 1300, the second air flow 116 is received into the GTE 102 as ram air 210.

In some embodiments of the method 1300, the GTE 102 is a turbofan engine 204 having a core gas path 242 and a bypass duct 226; the portion 248 of the first air flow 114 is a first portion of the first air flow 114; the first portion of the first air flow 114 is compressed inside the core gas path 242 and the method 1300 includes: receiving a second portion 246 of the first air flow 114 in the bypass duct 226; and after transferring heat between the compressed air 250 and the second air flow 116, discharging at least some of the second air flow 116 into the bypass duct 226.

In some embodiments, the method 1300 comprises directing at least some of the second air flow 116 into a stator vane 612 of the GTE 102.

In some embodiments, the method 1300 comprises directing at least some of the second air flow 116 and at least some of the compressed air 250 into a heat exchanger 206.

In some embodiments of the method 1300, the heat exchanger is disposed inside a plenum 262 radially outwardly of a spool 264 of the GTE 102.

In some embodiments, the method 1300 comprises further compressing the compressed air 250 after transferring heat between the compressed air 250 and the second air flow 116.

In some embodiments, the second air flow 116 or ram air 210 may be substantially cooler than the compressed air 250. For example, during sustained cruise flight at altitude, the ram air 210 may be over 100 degrees (F.) cooler (temperature delta) than the compressed air 250 when heat transfer occurs between them. In some embodiments, the temperature delta may be over 200 degrees (F.). In some embodiments, the temperature delta may be greater than 500 degrees (F.). In some embodiments, the temperature delta may be between 300 and 600 degrees (F.). In some embodiments, such a large temperature delta enables heat transfer to ram air 210 from the compressed air 250, thereby cooling the compressed air 250. In some embodiments, at an altitude at or above 41,000 ft and a cruise speed of 0.78 Mach, ambient air 110 may be at a temperature of −70 degrees (F.), while components of the compressor section 300 or compressed air 250 may be at 465 degrees (F.), giving a temperature delta of 535 degrees (F.).

In some embodiments, the compressor 202 may be enabled or facilitated by the use of the tower shaft 216. In some embodiments, the compressor 202 may not be directly rotatably driven by the turbine-driven shaft 236 because the GTE 102 may not have space to extend ram air (or second air flow) ducts all the way to the turbine-driven shaft 236 and/or extend a new tower shaft 216 separate from pre-existing tower shaft(s) to rotatably drive the compressor 202. Some embodiments of system(s) described herein, via the use of a pre-existing tower shaft 216 of a GTE 102, may enable a retrofit of the system described herein to the GTE 102 after the GTE 102 has come into operation or has otherwise undergone (or is undergoing) routine manufacturing.

In some embodiments, intercooling may yield improvements in efficiency over a simple cycle, especially at high pressure ratios. In various embodiments, aspects of the present disclosure may allow direct use of cold ambient air 110 without the need to carry coolant and/or implement a complex heat exchange apparatus for rejecting heat from a coolant, facilitate a direct interface (of cooling flow, such as ram air 210 from the ambient air 110) with compressor section 300 mass flow (or compressed air 250) without excessive piping, allow ease of implementing instrumentation to measure temperature/vibration/pressure or other properties, facilitate improvement of bypass flow 240 (increasing efficiency or propulsion of the fan 218) by reheating (compressed fan) air in the bypass duct 226, help reduce emission, boost compressor section 300 efficiency, and increase (overall) pressure ratio. In some embodiments, the cooler temperatures may cause a reduction in boundary layer thickness over GTE 102 components exposed to the cooled core gas path 242 via the temperature-dependence of air viscosity (possibly changing the mass flow rate in an advantageous manner).

As mentioned earlier, in some embodiments, intercooling between compressor section bladed rotors reduces the compressor section work requirement. In some embodiments, the net work output per unit of mass may increase with intercooling (and/or reheat). In some embodiments, greater GTE efficiency gains may be realized with a recuperator. A stator may be the heat exchanger 206 or heat transfer device to lower the temperature of air in the compressor section 300, such as compressed air 250, which is part of the core gas path 242. The stator may cooled using ambient air 110 which may be ram air 210. The flow of ambient air 110 may be controlled by a valve 230 (downstream from a filter in order to prevent contamination) via a controller such as an EEC or FADEC. This valve 230 may regulate flow depending on the conditions of the aircraft mission. In some cases, a small fan maybe required to draw in ambient air 110. Cooling channels may be provided within the stator. These cooling channels may be designed in a variety of patterns (vertical, horizontal or a combination).

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, systems and methods described herein may be augmented or otherwise work in conjunction with other efficiency-increasing operations of the GTE (such as heat recuperation, reheat, or even others) other heat exchanging methods may be used, ram air may be received via a plurality of inlets, ram air may undergo various fluid operations (compression, expansion, compositional change, heating, etc.) before or after receiving heat from the compressed air, a plurality of compressor sections may be provided in the GTE and one or more of the plurality of compressor sections may have flow therein reduced in temperature by means of heat transfer to the ram air (such as by means of cooled surfaces), the compressor may rotatably driven by electrical power or other means instead of by a tower shaft of the GTE, and liquid coolant or ram air may be circulated in the heat exchanger, stators, bladed rotors, or other components of the compressor section or GTE to reduce temperature of the air in the compressor section. Yet further modifications could be implemented by a person of ordinary skill in the art in view of the present disclosure, which modifications would be within the scope of the present technology.

The invention claimed is:

1. A method of operating a gas turbine engine (GTE) of an aircraft, the method comprising:
   receiving a first air flow of ambient air into the GTE via a main air intake leading to a core gas path and a bypass duct of the GTE;
   compressing at least a portion of the first air flow to generate compressed air;
   receiving a second air flow of ambient air into the GTE, the second air flow being received separately from the main air intake receiving the first air flow;
   transferring heat between the compressed air and the second air flow;

after transferring heat between the compressed air and the second air flow, receiving the compressed air in a combustor;

in the combustor, mixing the compressed air with fuel and igniting the mixed compressed air and fuel to generate a stream of combustion gas; and extracting energy from the combustion gas.

2. The method as defined in claim 1, comprising compressing the second air flow before transferring heat between the compressed air and the second air flow.

3. The method as defined in claim 2, comprising:
driving a compressor via a tower shaft drivingly coupled to a turbine-driven shaft of the GTE; and
using the compressor to compress the second air flow.

4. The method as defined in claim 1, wherein the second air flow is received into the GTE as ram air during flight of the aircraft.

5. The method as defined in claim 1, wherein:
the GTE is a turbofan engine;
the at least a portion of the first air flow is a first portion of the first air flow;
the first portion of the first air flow is compressed inside the core gas path and the method includes:
receiving a second portion of the first air flow in the bypass duct; and
after transferring heat between the compressed air and the second air flow, discharging at least some of the second air flow into the bypass duct.

6. The method as defined in claim 1, comprising directing at least some of the second air flow into a stator vane of the GTE.

7. The method as defined in claim 1, comprising directing at least some of the second air flow and at least some of the compressed air into a heat exchanger.

8. The method as defined in claim 7, wherein the heat exchanger is disposed inside a plenum radially outwardly of a spool of the GTE.

9. The method as defined in claim 1, comprising further compressing the compressed air after transferring heat between the compressed air and the second air flow.

* * * * *